UNITED STATES PATENT OFFICE.

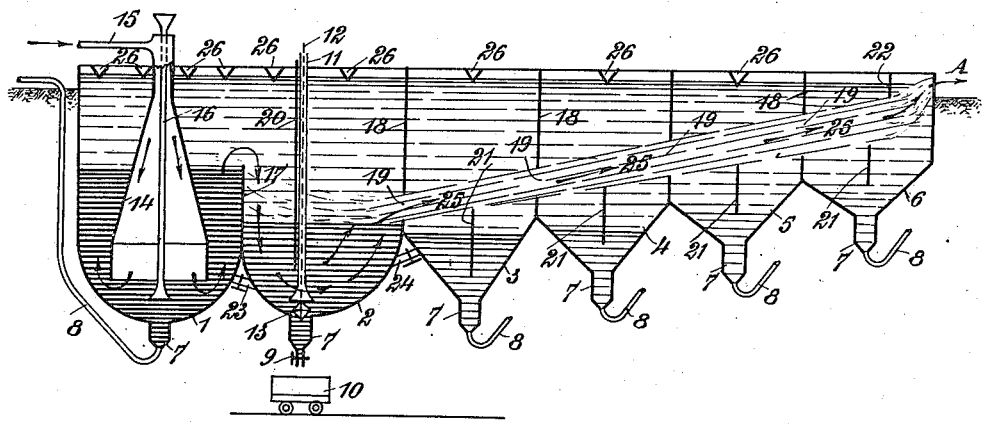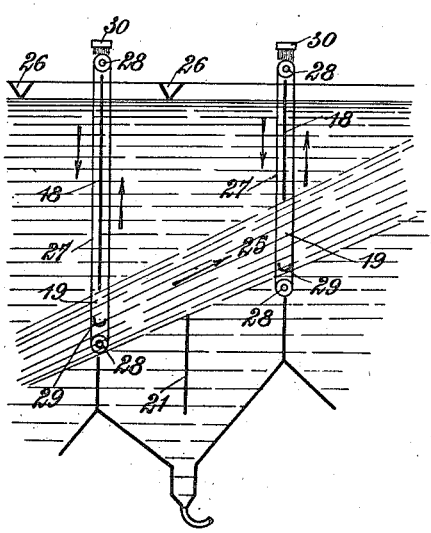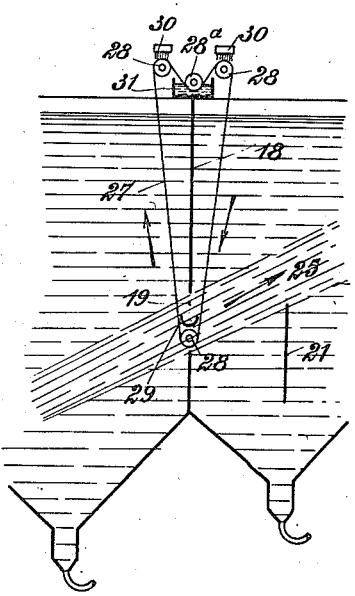

LUCIEN LINDEN, OF BRUSSELS, BELGIUM, ASSIGNOR TO WILLIAM J. STEWART, OF BELFAST, IRELAND.

PROCESS FOR PURIFYING SEWAGE AND OTHER LIQUIDS.

1,160,918.  Specification of Letters Patent.  Patented Nov. 16, 1915.

Original application filed January 30, 1914, Serial No. 815,487. Divided and this application filed June 29, 1914, Serial No. 847,917. Renewed May 27, 1915. Serial No. 30,862.

*To all whom it may concern:*

Be it known that I, LUCIEN LINDEN, a subject of the King of Belgium, and residing at Brussels, Belgium, have invented a new and useful Process for Purifying Sewage and other Liquids, of which the following is a specification.

This invention relates to an improved process for purifying sewage or other liquids by decanting, and filtration through the material deposited, the material being prevented from being drawn away by the purified liquid.

The invention described and claimed herein constitutes matter divided from my copending application for Letters Patent in the United States, Serial No. 815,487, filed January 30, 1914.

The improved process is characterized by the fact that the continuously flowing sewage or other liquid to be purified is decanted a first time so that the residues deposited form subsequently a filtering bed through which the liquid to be purified is caused to pass and which retains the solid substances in suspension in said liquid, which after leaving the filter forms within the liquid mass contained in the tank, a current whose velocity decreases toward the exit of the tank so as to prevent mud from being drawn away by the liquid toward the exit.

This improved process is carried into practice in an oblong tank or the like, the bottom of which has its general plane raised gradually toward the exit. According to this invention, the purifying tank is characterized by the fact that the bottom thereof is formed by a series of pockets, the depth of which decreases gradually toward the exit of the tank, impure water or sewage being admitted above the bottom of the first pocket, into which are deposited the thickest particles of impurities, through which the water flows subsequently, the water flowing downwardly and around the lower edge of a vertical partition into the second pocket, from which it is discharged into the liquid mass contained in the tank, wherein it forms a current which is slightly inclined upwardly toward the exit of the tank and whose speed is decreased gradually because said current passes through gradually increasing openings provided in vertical partitions arranged to separate the different pockets from each other, for the purpose of causing the materials in suspension which becomes gradually lighter to be deposited in the succeeding pockets before the water reaches the exit of the tank, and for the purpose of preventing any filtering material from being drawn away by the flow of water.

One form of construction of my improved purifying tank is illustrated in the accompanying drawings, wherein—

Figure 1 is a vertical longitudinal section through the complete tank, Figs. 2 and 3 show details hereinafter referred to.

The bottom of the tank which is preferably of oblong form, is slightly inclined upwardly toward the exit A of the tank and formed of a series of funnel-shaped pockets, 1, 2, 3, 4, 5, 6, the depth of which is gradually decreased toward the exit. The bottom of the first and second pockets 1, 2, which are of larger capacity than the following pockets, is preferably curved, cylindrical or spherical, while the bottom of the pockets 3, 4, 5, 6 is formed of walls inclined toward the center of each pocket. Each pocket is provided with a central downwardly projecting cylindrical extension 7, to which is connected a pipe 8 for the discharge of the solid residues collected in the pocket. Within said cylindrical extensions 7 the mud will be compressed by the weight of the water above the same in such a way that it loses about 50% of its water of liquid. The cylindrical extension 7 of the second collector may be provided with a valve or the like 9, through which the mud collected in said pocket may be discharged directly, say into a wheeled car, running on a track below the tank. In order to facilitate the discharge of mud from said collector 2, if the mud forms a compact lump in the extension 7, I provide vertically above the latter a tubular guide 11, within which a rod 12, the lower end of which is provided with a suitable head 13, may be reciprocated vertically in order to crush the lump of mud and force the same outwardly through the discharge pipe.

In to the first collector 1 is dipped a more or less conical bell-shaped hood 14, the upper tubular end of which is connected to the water inlet pipe 15. Arranged in the vertical center of said head is a vertical pipe 16, through which suitable sterilizing substances may be introduced and uniformly distributed into the solid residues collected upon the bottom of the collector 1, in order to kill the micro-organisms contained in the residues and avoid the decay thereof.

The collectors 1, 2 are separated from each other by a partition 17, extending from the bottom upwardly to a certain height, while the collectors 2, 3, 4, 5, 6 are separated from each other by vertical partitions 18, extending from the common wall between two adjacent collectors upwardly to the upper rim of the tank. Arranged in said partitions are openings 19, the area of which is gradually increased toward the exit and the centers of which are located on a straight line, which is slightly inclined upwardly toward the exit A.

The collector 2 is divided into two unequal communicating compartments by a vertical partition 20, which forces the water discharged from the collector 1 to pass downwardly across the bottom of the collector 2, that is through the mud deposited upon said bottom. Each of the following collectors has a vertical partition 21, serving to lead the particles of mud descending in said collectors toward the bottom of the latter and to avoid any whirling of the liquid in these collectors. Arranged in front of the exit A is another partition 22 serving to avoid any movement of the upper liquid layers in the last collector 6.

The collector 2 is connected on one hand by means of an outer valved pipe 23 to the collector 1, and on the other hand by means of a similar pipe 24 to the collector 3. Through these two pipes a portion of the residues collected in the pockets 1, 3 may be conducted into the pocket 2, should the latter not contain a sufficient quantity of residue.

The improved purifying tank operates as follows:—The impure water or sewage fed through the pipe 15, flows downwardly through the hood 14 toward the bottom of the collector 1 where the heaviest materials are deposited, whereupon the water flows upwardly all around the hood through the mud deposited in order to be coarsely filtered. Now the water is discharged into the collector 2, wherein it is forced by the partition 20 to flow toward and across the bottom, upon which lighter particles of mud will be deposited, said particles of mud forming a filtering bed after a certain lapse of time, through which the subsequently admitted water is forced to pass in order to be filtered a second time. Owing to the fact that the width of the two compartments formed in the collector 2 by the partition 20 becomes gradually unequal, the water will be discharged from the collector 2 at much lower speed, so that the greatest part of its mud will be deposited into this collector and into the following collector 3. The water which is now purified to a more or less great extent flows through the openings 19 of the different partitions 18 and successively above the different collectors 3, 4, 5, 6, into which the remaining particles of mud will be deposited. The current of liquid formed within the liquid mass owing to the arrangement of the partitions 18 extending upwardly to the upper rim of the tank flows toward the exit A at gradually decreasing speed, because the area of the openings 19 is gradually increased toward said exit. Owing to this particular feature the particles of mud in suspension which become gradually lighter, will be enabled to be slowly lowered into the collectors 3, 4, 5, 6, as soon as they meet with the partitions 21 of said collectors, and also because the liquid is nearly immovable in said collectors.

The filtering bed of the collector 2 may be increased by the opening of the valves provided in the connecting pipes 23, 24, or by introducing suitable materials into said collector capable of forming a filter bed with the residue and retaining the light materials in suspension.

The mud deposited in the collectors 1, 2, 3, 4 . . . may be sterilized continuously or intermittently by means of suitable sterilizing substances introduced into each collector through vertical pipes such as 16, in order to avoid decay in said mud.

The same pipe 16 or another similar pipe may be utilized for introducing carbonic acid into the mass of mud contained in the tank, if lime, lime-water or lime-milk as a precipitating means has been added to and thoroughly mixed with the impure water prior to its admission into the hood 14. When the water enters the tank, the precipitation will be complete and the carbonic acid gas introduced as described will transform the lime into carbonate of lime or chalk.

The chalk mixed with the filtering mud in the collector 1 and also if necessary in the following collectors 2, 3 . . . forms a perfect filtering bed with the residual mud, said filtering bed retaining the materials in suspension in a perfect manner, rendering the filtering bed more compact and preventing the same from being drawn away by the flowing water.

The carbonic acid gas introduced exclusively and directly into the bottom part of the tank, fulfils an active function in this part just at the moment when the chalk becomes useful for the formation of the filtering bed. The carbonic acid gas must be introduced under pressure through the pipe 16, so that said gas must find its way through the entire mass of mud. The mud deposited will be discharged through the pipes 8 as required, while the excess of filtering material may be removed from the collector 2 by means of the device 12, 13.

The water may be further purified and any particle of mud may be retained by causing the current 25 to flow through a filtering fabric of cotton or the like, arranged and cleaned in the following way:—As shown in Figs. 2 and 3, an endless band of linen or the like 27 extends around each partition 18 and over rollers 28, so that the current 25 is caused to flow through both leads of the band. Arranged at the lower end of the pocket formed by the endless band is a tray 29 terminating into a pipe extending outwardly and provided with a valve for emptying said tray. Brushes 30 in contact with the upper part of the band, remove the impurities deposited upon said band. These impurities are partly removed by the flowing water. In fact the surface of the band upon which the impurities have been deposited is preferably moved upwardly through the next collector and the impurities are deposited into the latter after being loosened by the water flowing through the band.

The filtering band may be sterilized either by chemicals or by boiling water contained in a suitable trough 31 arranged at the top of each partition 18, the filtering band 27 passing around a roller 28ª dipped into the sterilizing liquid.

Arranged at suitable intervals above the normal level of liquid are transverse trays 26, connected to a collecting tray (not shown). The exit A being completely closed, the level of liquid will be raised in the various collectors until the water flows over the upper rims of the trays 26. The grease, scum and the like collected upon the surface of the liquid is thus discharged into the transverse trays 26 and the collecting tray connected to the latter, so that the water contained in the tank will be deprived from any superficial impurity, the greasy substances being at the same time recovered without expense. The exit A being then opened again, the level of liquid will be lowered below the transverse trays 26 and the operation already described will be continued. The removal of greasy substances may be repeated according to the requirements.

The number of collectors 1, 2, 3 . . . may be increased or decreased as required or desired without departing from the scope of my invention.

Having fully described my invention, what I claim and desire to secure by Letters Patent is:—

1. An improved process of purifying water, sewage and any other liquid, which consists in first decanting the continuously flowing impure water, collecting the residues separated from the water and forming a filtering bed of the same, causing the impure water to pass through the latter and to be discharged from the same at low speed, then causing the filtered water to form in the mass of water a current flowing at a gradually decreasing speed to enable light materials in suspension to be separated by gravity, and preventing the separated residues from being drawn away by the flowing water, substantially as set forth.

2. An improved process of purifying water, sewage and any other liquid, which consists in first decanting the continuously flowing impure water, collecting the residues separated from the water and forming a filtering bed of the same, and causing the impure water to pass through the latter and to be discharged from the same.

3. An improved process of purifying water, sewage and any other liquid, which consists in first decanting the continuously flowing impure water, collecting the residues separated from the water, then causing the water to form in the mass of water a current flowing at a gradually decreasing speed to enable light materials in suspension to be separated by gravity, and preventing the separated residues from being drawn away by the flowing water.

4. An improved process of purifying water, sewage and any other liquid, which consists in first decanting the continuously flowing impure water, collecting the residues separated from the water and forming a filtering bed of the same, causing the impure water to pass through the latter and to be discharged from the same at low speed, then causing the filtered water to form in the mass of water a current flowing at a gradually decreasing speed to enable light materials in suspension to be separated by gravity, preventing the separated residues from being drawn away by the flowing water, and collecting from the top of the mass of the water material floating thereon.

5. An improved process of purifying water or other liquids, which consists in causing a current of liquid to flow at a gradually decreasing velocity through the mass of liquid to decant the impurities therefrom, and in preventing said impurities from being carried forward with the flowing liquid.

6. An improved process of purifying water or other liquids which consists in causing a current of liquid to flow at a gradually decreasing velocity through the mass of liquid in a direction slightly upwardly inclined from the horizontal, and in arresting by means adapted to prevent their further movement with the flowing liquid the impurities which are being decanted from said current.

7. An improved process of purifying water or other liquids which consists in inducing a current to flow through a mass of the liquid at a gradually decreasing velocity from the deep to the shallow end of a series of connected compartments of regularly decreasing depth, and each provided with a pocket for the collection and removal of impurities decanted from the liquid during its flow.

8. An improved process of purifying water or other liquids which consists in inducing a stream thereof to flow for some distance through a mass of liquid, and in controlling said stream by means of orifices of successively greater dimensions in partitions in the vessel containing said mass of liquid to gradually retard the motion from one end to the other of the flowing stream.

9. An improved process of purifying water or other liquids which consists in inducing a stream thereof to flow for some distance through a mass of the liquid, in a substantially horizontal but upwardly tending direction, and in controlling said stream by means of orifices of successively greater dimensions in partitions in the vessel containing said mass of liquid to gradually retard the motion from one end to the other of the flowing stream.

10. An improved process of purifying water or other liquids which consists in inducing a stream thereof to flow for some distance through a mass of the liquid, in a substantially horizontal but upwardly tending direction, in controlling said stream by means of orifices of successively greater dimensions in partitions in the vessel containing said mass of liquid to gradually retard the motion from one end to the other of the flowing stream, and in arresting at the lower surface of said stream the impurities decanted therefrom during the flow.

LUCIEN LINDEN.

Witnesses:
   José P. Wagner,
   Chas. Roy Nasmith.